US 10,769,852 B2

United States Patent
McArdle et al.

(10) Patent No.: US 10,769,852 B2
(45) Date of Patent: Sep. 8, 2020

(54) METHOD FOR SIMULATING NATURAL PERCEPTION IN VIRTUAL AND AUGMENTED REALITY SCENES

(71) Applicant: Aria Glassworks, Inc., San Francisco, CA (US)

(72) Inventors: Terrence Edward McArdle, San Francisco, CA (US); Benjamin Zeis Newhouse, San Francisco, CA (US)

(*) Notice: Subject to any disclaimer, the term of this patent is extended or adjusted under 35 U.S.C. 154(b) by 0 days.

(21) Appl. No.: 14/211,786

(22) Filed: Mar. 14, 2014

(65) Prior Publication Data

US 2014/0267418 A1     Sep. 18, 2014

Related U.S. Application Data

(60) Provisional application No. 61/782,392, filed on Mar. 14, 2013.

(51) Int. Cl.
  *G06T 19/00*     (2011.01)
  *G06F 3/01*      (2006.01)

(52) U.S. Cl.
  CPC ............ *G06T 19/006* (2013.01); *G06F 3/013* (2013.01)

(58) Field of Classification Search
  CPC .................................................. G06T 19/006
  USPC ....................................................... 345/633
  See application file for complete search history.

(56) References Cited

U.S. PATENT DOCUMENTS

| 5,287,437 | A  | 2/1994  | Deering          |
| 5,745,126 | A  | 4/1998  | Jain et al.      |
| 5,841,439 | A  | 11/1998 | Pose et al.      |
| 5,990,941 | A  | 11/1999 | Jackson et al.   |
| 6,226,669 | B1 | 5/2001  | Huang et al.     |
| 6,389,179 | B1 | 5/2002  | Katayama et al.  |
| 6,760,026 | B2 | 7/2004  | Li et al.        |
| 7,133,068 | B2 | 11/2006 | Fisher et al.    |
| 7,136,090 | B1 | 11/2006 | McDuffie         |
| 7,224,326 | B2 | 5/2007  | Sefton           |
| 7,389,591 | B2 | 6/2008  | Jaiswal et al.   |
| 7,424,218 | B2 | 9/2008  | Baudisch et al.  |
| 7,499,586 | B2 | 3/2009  | Agarwala et al.  |
| 7,564,469 | B2 | 7/2009  | Cohen            |
| 7,688,346 | B2 | 3/2010  | Richards         |
| 8,041,574 | B2 | 10/2011 | Yano             |
| 8,144,232 | B2 | 3/2012  | Larson et al.    |
| 8,154,634 | B2 | 4/2012  | Fukumoto         |
| 8,301,159 | B2 | 10/2012 | Hamynen et al.   |
| 8,373,573 | B2 | 2/2013  | Chou et al.      |
| 8,384,718 | B2 | 2/2013  | Dahlke           |

(Continued)

FOREIGN PATENT DOCUMENTS

WO     2008/107553 A2     9/2008

OTHER PUBLICATIONS

"Motion Control Simulation Applet" http://ir.exp.sis.pitt.edu/res2/data/is/group5/. Archived on Sep. 1, 2006. Retrieved on Nov. 5, 2013 from <https://web.archive.org/web/20060901110520/http://irexp.sis.pitt.edu/res2/data/is/group5/>.

(Continued)

*Primary Examiner* — Hai Tao Sun

(57) ABSTRACT

A preferred method for dynamically displaying virtual and augmented reality scenes can include determining input parameters, calculating virtual photometric parameters, and rendering a VAR scene with a set of simulated photometric parameters.

20 Claims, 2 Drawing Sheets

(56) References Cited

U.S. PATENT DOCUMENTS

| | | | |
|---|---|---|---|
| 8,698,902 B2* | 4/2014 | Kawamoto | G06T 19/006 348/207.1 |
| 8,730,156 B2 | 5/2014 | Weising et al. | |
| 9,017,163 B2 | 4/2015 | Newhouse et al. | |
| 9,418,479 B1 | 8/2016 | Worley, III et al. | |
| 2001/0030693 A1 | 10/2001 | Fisher et al. | |
| 2002/0140666 A1 | 10/2002 | Bradski | |
| 2002/0158873 A1 | 10/2002 | Williamson | |
| 2003/0065668 A1 | 4/2003 | Sowizral et al. | |
| 2003/0174136 A1 | 9/2003 | Emberling et al. | |
| 2004/0027330 A1 | 2/2004 | Bradski | |
| 2005/0219239 A1 | 10/2005 | Mashitani et al. | |
| 2005/0232507 A1* | 10/2005 | Zimmer | G06T 5/20 382/264 |
| 2005/0286125 A1 | 12/2005 | Sundstrom et al. | |
| 2006/0050140 A1 | 3/2006 | Shin et al. | |
| 2006/0082692 A1 | 4/2006 | Kamijima et al. | |
| 2006/0232665 A1 | 10/2006 | Schowengerdt et al. | |
| 2006/0239525 A1* | 10/2006 | Katayama | G06T 7/0044 382/128 |
| 2007/0025723 A1 | 2/2007 | Baudisch et al. | |
| 2007/0035562 A1 | 2/2007 | Azuma et al. | |
| 2007/0076016 A1 | 4/2007 | Agarwala et al. | |
| 2007/0103543 A1 | 5/2007 | Anderson et al. | |
| 2007/0168418 A1 | 7/2007 | Ratnakar | |
| 2007/0236493 A1 | 10/2007 | Horiuchi et al. | |
| 2008/0042973 A1 | 2/2008 | Zhao et al. | |
| 2008/0071559 A1 | 3/2008 | Arrasvuori | |
| 2008/0082692 A1 | 4/2008 | Yano | |
| 2008/0094417 A1 | 4/2008 | Cohen | |
| 2008/0194323 A1 | 8/2008 | Merkli et al. | |
| 2008/0266326 A1 | 10/2008 | Porwal | |
| 2008/0280676 A1 | 11/2008 | Distanik et al. | |
| 2008/0292131 A1 | 11/2008 | Takemoto et al. | |
| 2008/0309508 A1 | 12/2008 | Harmon | |
| 2008/0320422 A1 | 12/2008 | Cazeaux | |
| 2009/0140887 A1 | 6/2009 | Breed et al. | |
| 2009/0237564 A1 | 9/2009 | Kikinis et al. | |
| 2009/0240431 A1 | 9/2009 | Chau et al. | |
| 2009/0244097 A1 | 10/2009 | Estevez | |
| 2009/0292774 A1 | 11/2009 | Box et al. | |
| 2010/0001980 A1 | 1/2010 | Kim et al. | |
| 2010/0002122 A1 | 1/2010 | Larson et al. | |
| 2010/0007657 A1 | 1/2010 | Rurin | |
| 2010/0066763 A1 | 3/2010 | MacDougall et al. | |
| 2010/0092079 A1 | 4/2010 | Aller | |
| 2010/0125816 A1 | 5/2010 | Bezos | |
| 2010/0161658 A1 | 6/2010 | Hamynen et al. | |
| 2010/0169837 A1 | 7/2010 | Hyndman | |
| 2010/0171758 A1 | 7/2010 | Maassel et al. | |
| 2010/0188397 A1 | 7/2010 | Tsai et al. | |
| 2010/0208033 A1 | 8/2010 | Edge et al. | |
| 2010/0214111 A1 | 8/2010 | Schuler et al. | |
| 2010/0228633 A1 | 9/2010 | Guimaraes Stella et al. | |
| 2010/0287485 A1 | 11/2010 | Bertolami et al. | |
| 2011/0041060 A1 | 2/2011 | Chien et al. | |
| 2011/0069229 A1* | 3/2011 | Lord | G11B 27/022 348/461 |
| 2011/0090252 A1 | 4/2011 | Yoon et al. | |
| 2011/0164116 A1 | 7/2011 | Gay et al. | |
| 2011/0201362 A1 | 8/2011 | Bregman-Amitai et al. | |
| 2011/0213861 A1 | 9/2011 | Fanelli et al. | |
| 2011/0216060 A1* | 9/2011 | Weising | G09G 5/08 345/419 |
| 2011/0234631 A1* | 9/2011 | Kim | G06T 15/60 345/632 |
| 2011/0242134 A1 | 10/2011 | Miller et al. | |
| 2011/0248987 A1 | 10/2011 | Mitchell | |
| 2011/0273451 A1 | 11/2011 | Salemann | |
| 2012/0026166 A1 | 2/2012 | Takeda et al. | |
| 2012/0086728 A1 | 4/2012 | Mcardle et al. | |
| 2012/0105440 A1 | 5/2012 | Lieberman et al. | |
| 2012/0105483 A1* | 5/2012 | Fedorovskaya | G02B 27/017 345/660 |
| 2012/0113264 A1 | 5/2012 | Moshrefi et al. | |
| 2012/0194553 A1* | 8/2012 | Osterhout | G02B 27/0093 345/633 |
| 2012/0212405 A1 | 8/2012 | Newhouse et al. | |
| 2012/0214590 A1* | 8/2012 | Newhouse | G06F 3/011 463/31 |
| 2012/0218306 A1 | 8/2012 | McArdle et al. | |
| 2012/0236029 A1 | 9/2012 | Newhouse et al. | |
| 2012/0242656 A1 | 9/2012 | McArdle et al. | |
| 2012/0242798 A1 | 9/2012 | McArdle et al. | |
| 2012/0246223 A1 | 9/2012 | Newhouse et al. | |
| 2013/0038609 A1 | 2/2013 | Tsai et al. | |
| 2014/0019166 A1* | 1/2014 | Swanson | G06Q 40/08 705/4 |
| 2014/0092135 A1 | 4/2014 | McArdle et al. | |
| 2015/0070347 A1 | 3/2015 | Hofmann et al. | |
| 2015/0097867 A1 | 4/2015 | McArdle et al. | |
| 2015/0113581 A1 | 4/2015 | McArdle et al. | |
| 2015/0201133 A1 | 7/2015 | Newhouse et al. | |
| 2015/0243085 A1 | 8/2015 | Newhouse et al. | |
| 2015/0356788 A1 | 12/2015 | Abe et al. | |
| 2016/0262608 A1 | 9/2016 | Krueger | |
| 2017/0010469 A1 | 1/2017 | Samec et al. | |
| 2017/0193709 A1 | 7/2017 | McArdle et al. | |
| 2017/0366758 A1 | 12/2017 | Newhouse et al. | |

OTHER PUBLICATIONS

"Rotations and Euler angles" http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.

Hwang, Jane, Jaehoon Jung, and Gerard Jounghyun Kim, "Handheld virtual reality: a feasibility study." *Proceedings of the ACM Symposium on Virtual Reality Software and Technology.* ACM, 2006.

Ducket, Jon, "Beginning HTML, XHTML, CSS, and JavaScript (R)," Dec. 30, 2009, Wrox, p. 234.

Easypano Holdings Inc., "Panoweaver 6.00 User Manual", Copyright Easypano Holdings Inc., date unknown, downloaded from http://web.archive.org/web/20090711113513/http://www.easypano.com/download/doc/pw600_manual.pdf with an archive.org verified date of Jul. 11, 2009, pp. 24-74.

Hewlett Packard, "HP Photosmart R717 Digital Camera with HP Instant Share User's Manual", Copyright 2005 Hewlett-Packard Development Company, L.P., downloaded from http://h10032.www1.hp.com/ctg/Manuals/c00298985.pdf on May 3, 2013, pp. 50-54.

Fauster, Loris, and T. U. Wien. "Stereoscopic techniques in computer graphics." TU Wien (2007), 10 pages.

Kanbara, Masayuki, et al. "A stereoscopic video see-through augmented reality system based on real-time vision-based registration." Virtual Reality, 2000. Proceedings. IEEE. IEEE, 2000, 8 pages.

Parr62, Ben; "Easter Egg: Yelp Is the iPhone's First Augmented Reality App,"; located at https://web.archive.org/web/20090829094113/http://mashable.com/2009/08/2007/yelp-aug . . . ; Aug. 27, 2009; 10 pages.

Hildenbrand, Jerry; "Yelp 2.0 brings monocle and checkins to its Android Client,"; located at http:/www.androidcentral.com/yelp-20-brings-monocle-andcheckins-its-android-client; Jul. 5, 2010; 10 pages.

U.S. Appl. No. 14/668,915, Sep. 29, 2016, Office Action.
U.S. Appl. No. 14/044,287, Dec. 6, 2016, Notice of Allowance.
U.S. Appl. No. 14/628,113, Sep. 23, 2016, Office Action.
U.S. Appl. No. 13/269,231, Nov. 8, 2013, Office Action.
U.S. Appl. No. 13/269,231, Aug. 1, 2014, Notice of Allowance.
U.S. Appl. No. 14/533,000, Mar. 5, 2015, Office Action.
U.S. Appl. No. 14/533,000, Jun. 11, 2015, Office Action.
U.S. Appl. No. 14/533,000, Aug. 12, 2015, Notice of Allowance.
U.S. Appl. No. 13/302,964, Jun. 10, 2013, Office Action.
U.S. Appl. No. 13/302,964, Feb. 11, 2014, Office Action.
U.S. Appl. No. 13/302,964, Aug. 14, 2014, Office Action.
U.S. Appl. No. 13/302,964, Feb. 6, 2015, Office Action.
U.S. Appl. No. 13/302,964, Mar. 30, 2015, Notice of Allowance.
U.S. Appl. No. 13/302,977, May 15, 2013, Office Action.
U.S. Appl. No. 13/302,977, Aug. 14, 2014, Office Action.

(56) References Cited

OTHER PUBLICATIONS

U.S. Appl. No. 13/302,977, Jan. 13, 2015, Notice of Allowance.
U.S. Appl. No. 13/347,273, Apr. 23, 2014, Office Action.
U.S. Appl. No. 13/347,273, Oct. 20, 2014, Notice of Allowance.
U.S. Appl. No. 14/582,017, Jun. 19, 2015, Office Action.
U.S. Appl. No. 14/582,017, Oct. 14, 2015, Notice of Allowance.
U.S. Appl. No. 14/582,017, Nov. 6, 2015, Notice of Allowance.
U.S. Appl. No. 13/411,347, Feb. 10, 2014, Office Action.
U.S. Appl. No. 13/411,347, Oct. 21, 2014, Office Action.
U.S. Appl. No. 13/411,347, May 19, 2015, Notice of Allowance.
U.S. Appl. No. 13/410,176, Jun. 21, 2013, Office Action.
U.S. Appl. No. 13/410,176, Mar. 20, 2014, Office Action.
U.S. Appl. No. 13/410,176, Aug. 22, 2014, Office Action.
U.S. Appl. No. 13/410,176, Mar. 3, 2015, Notice of Allowance.
U.S. Appl. No. 14/044,287, Aug. 19, 2015, Office Action.
U.S. Appl. No. 14/044,287, Feb. 5, 2016, Office Action.
U.S. Appl. No. 14/044,287, Jun. 30, 2016, Office Action.
U.S. Appl. No. 14/628,113, May 19, 2016, Office Action.
U.S. Appl. No. 14/668,915, Mar. 21, 2017, Notice of Allowance.
U.S. Appl. No. 14/628,113, Apr. 13, 2017, Office Action.
U.S. Appl. No. 14/628,113, May 31, 2018, Office Action.
U.S. Appl. No. 15/463,926, May 23, 2018, Notice of Allowance.
U.S. Appl. No. 15/640,858, Aug. 16, 2018, Office Action.
U.S. Appl. No. 14/628,113, Oct. 18, 2017, Office Action.
U.S. Appl. No. 15/463,926, Oct. 6, 2017, Office Action.
U.S. Appl. No. 15/640,858, Feb. 26, 2019, Office Action.
U.S. Appl. No. 15/640,858, Jun. 20, 2019, Notice of Allowance.

* cited by examiner

METHOD FOR SIMULATING NATURAL PERCEPTION IN VIRTUAL AND AUGMENTED REALITY SCENES

CLAIM OF PRIORITY

The present application claims the benefit of U.S. Provisional Patent Application No. 61/782,392 filed on 14 Mar. 2013, the entirety of which is incorporated herein by this reference.

TECHNICAL FIELD

This invention relates generally to the virtual and augmented reality field, and more specifically to a new and useful system and method for simulating perception in virtual and augmented reality scenes in the information display field.

BACKGROUND

With the gaining popularity of mobile phones and mobile/tablet computers, virtual and augmented reality applications are becoming more approachable by the general public. However, as augmented and virtual realities become more widely accepted, there are numerous challenges to create an interface understandable and navigable by a wide variety of users. One aspect of virtual and augmented reality (VAR) scenes is that it is difficult to represent the contents of a VAR scene that mimics the real world on a display that can only represent a fixed range of photometric parameters at once. As a VAR scene consists of content in multiple directions, the diverse range of photometric content represented can often be much wider than would typically be expressed in an image or other digital or non-digital medium. Existing approaches attempt to remap some photometric parameters such as exposure to a narrower dynamic range using a static function. Since a user's eyes naturally do not have such a dynamic range and since the static function often loses relative exposure information for the purpose of preserving detail, results often look unnatural. Thus there is a need in the virtual and augmented reality field to create a new and useful method for displaying photometrically diverse virtual and augmented reality scenes on a display. This invention provides such a new and useful method for displaying photometrically diverse VAR scenes on a display of limited photometric range.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
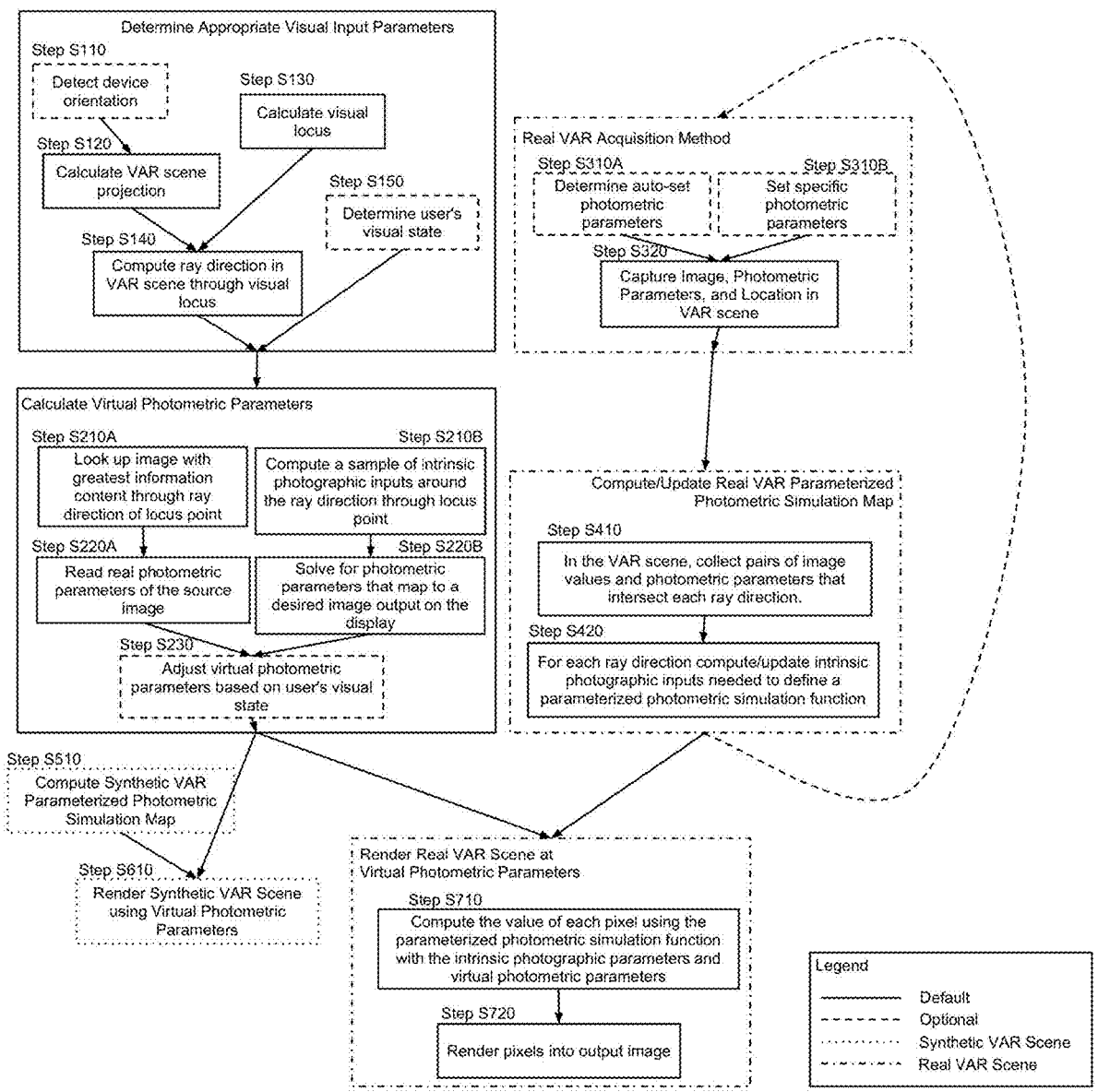
FIG. 1 is a schematic representation of a method of a first preferred embodiment of the invention.
Figure 2:
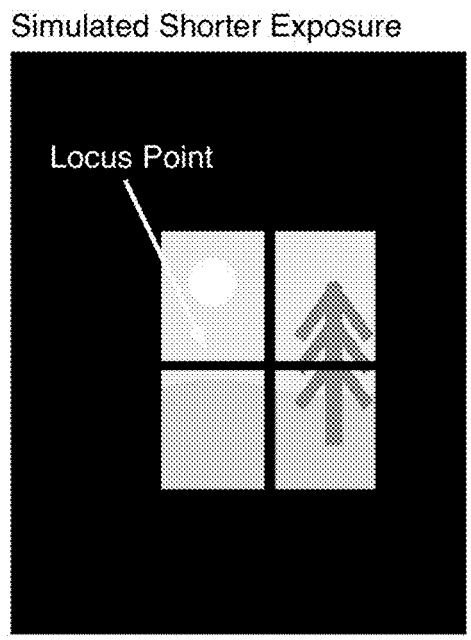
FIG. 2 is a representation of adapting the scene display to changes in the locus point of the image.
Figure 2:
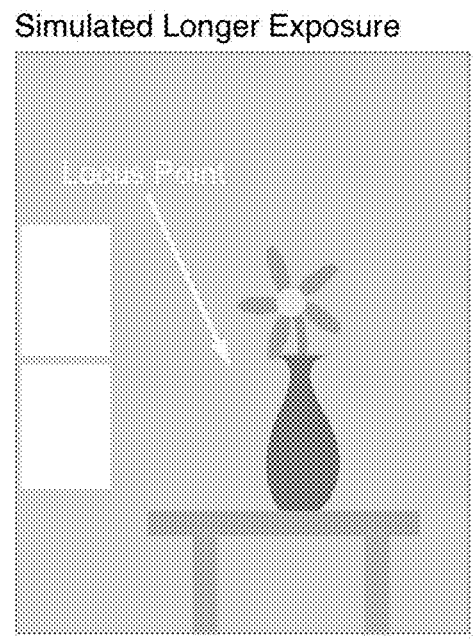
Figure 2:
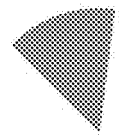
Figure 2:
Figure 2:
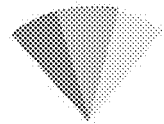

As shown in FIG. 1, the method of a preferred embodiment includes first determining appropriate visual input parameters which includes the steps of optionally detecting device orientation S110A, calculating a VAR scene projection from the device orientation and other scene configuration parameters S120, calculating a visual locus of the VAR scene S130, computing ray direction in a VAR scene through the visual locus S140, optionally determining additional visual state of the user S150. While steps and process of the preferred embodiment are described in a particular sequence, the process may be alternatively configured for performing operations in any suitable order or approach (e.g., sequentially or in parallel).

Next the method includes steps to calculate a set of virtual photometric parameters, which includes either looking up an image with the greatest information content that intersects the ray through the locus point S210A and then reading the using the real photometric parameters of this single source image for the virtual photometric parameters S220A, or computing a statistical fingerprint of intrinsic photographic inputs around the ray direction through the locus point S210B and then solving for the photometric parameters that map the intrinsic photographic inputs to a desired image output S220B, next the virtual photometric parameters may be optionally adjusted by user's visual state.

Next the method includes steps to render the VAR scene using the virtual photometric parameters. If the VAR scene contains synthetic elements than the synthetic elements may be rendered by passing the virtual photometric parameters to the graphics engine S610 and determining the intrinsic photographic inputs from S510. If the VAR scene contains real elements then intrinsic photographic inputs are combined with the final virtual photometric parameters S710 and then combined with other computer image values into a final image S720.

In order to generate a map of intrinsic photographic inputs and their corresponding image generation functions given photometric parameters, images are first captured with either an automatically determined exposure S310A or a manually set exposure S310B. The image itself, its location in the VAR scene and its photometric parameters are preferably recorded S320.

The photometric parameters of the captured images and the output image values can be collected S410 and then combined to compute the intrinsic photographic inputs along each ray of the VAR scene S420 which is then preferably used elsewhere to find the optimal virtual photometric parameters S220B and to simulate virtual photometric parameters S710.

The virtual and augmented reality scene may consist of a 3D model, a partially or wholly spherical photo, digitally generated environment map, and/or another suitable model presentable in 3D space.

Preferably, an image is approximated as being the result of a function which takes in intrinsic properties of a scene—such as, but not limited to, the objects in the scene, their reflectivity and radiosity, atmospheric effects, etc. —and combines them with photometric parameters such as, but not limited to, exposure, white balance, etc. to produce a resulting image. By measuring intrinsic properties of a scene and then varying the photometric parameters of image creation one can simulate virtual images as if the user was looking at the VAR scene in configurations that were not discretely captured from the real world.

Step S110, which includes detecting orientation of a computing device functions to determine the orientation of the computing device. The computing device preferably includes an inertial measurement unit (IMU) that preferably includes a 3-axis magnetometer, a 3-axis accelerometer, or a 3-axis gyroscope. The IMU may alternatively include any suitable combination of the above components or a single or double axis sensor or any suitable sensor combination to detect orientation. Additionally, Step S110 may include detecting positioning location, which preferably provides another parameter for determining orientation and position. A global positioning system (GPS) can preferably be used to determine geographical location. Orientation information may be gathered in any suitable manner including device API's or through any suitable API exposing device orientation information such as using HTML5 to access device orientation or CoreMotion on an iOS platform or the equivalent on Android and Windows platforms. An imaging system may additionally be used to perform image processing on the surrounding environment. Preferably, the image system is a forward or backward facing camera that can be used to determine the position of a user looking at the computing device. In the case where there are no suitable sensors, this step may represent the device orientation as the identity orientation.

Step S120 provides a method to derive a 3D projection of a var scene to a digital display. The projection preferably, but is not limited to, takes as input the device orientation, a desired field-of-view, and other additional rotations or translations and returns a projection transformation function that enables a 3D ray to be computed through any point on the screen. Standard projective geometry or any other suitable implementation may be employed.

Step S130 provides a method to derive a visual locus on the display at which to base future computations around desired virtual photometric parameters. In one preferable implementation, this is simply the center of the screen. In another preferable implementation, this is the point at which a user's eyes are focused on screen. This may be measured via optical eye-tracking, sensors that track muscle contractions or blood flow, or any other suitable means to determine the position and orientation of the eyes. In another preferable implementation, this point is the point at which a user has last touched or is the point under which a user has moved a cursor.

Step S140 computes a ray direction of the VAR scene through the visual locus on screen. One possible method, which this method is not limited to, is rotating a vector perpendicular to the screen through the locus point using the field of view and aspect ratio of the projection and then rotating the resulting vector by the orientation of the projection. Any suitable mathematical algorithm may be used.

Step S150 captured any additional visual state of the user. One preferable implementation may, but is not limited to, capture the dilation of the user's pupils. Another preferable implementation may capture the ambient light around the user. Another preferable implementation may capture the location of the sun via optical means, via reading the user's location and current time or any other suitable means. This allows us to later adjust the virtual photometric parameters to compensate to these inputs. In one such implementation, exposure may be artificially increased if the user's pupils are dilated and artificially decreased if the user's pupils are constricted.

The next series of steps pertain to calculating a set of virtual photometric parameters. Virtual photometric parameters may include, but are not limited to, lens aperture, exposure time, gain, CCD sensitivity, ISO, focal length, white balance, sharpness, contrast, stereo parallax, radial or translational motion or any other suitable photographic metric that when varied impacts the captured image from a camera.

Any suitable means of computing virtual photometric parameters may be used, two preferable methods proposed include computing virtual photometric parameters based on a basis image (Step S210A and Step S220A) or computing virtual photometric parameters based on solving an optimization problem over the virtual photometric parameters needed to produce a desired simulated image when provided with a sample of intrinsic photographic inputs (Step S210B and Step S220B).

Step S210 provides a method to select a representative image that approximates an ideal set of photometric parameters at a locus point. One such implementation may, but is not limited to, finding the set of images that intersect with a ray in a VAR scene. This may be done preferably by, but limited to, maintaining a discretized mapping for each 3D vector through the origin of a VAR scene to a list of images that contain image data along the 3D vector. One such mapping may be from 3D vectors through the origin to the sides of a cube, another such mapping may be from 3D vectors to pixels in an equirectangular map. Any suitable mapping may be used that allows for the lookup of a list of images from a 3D vector underneath a focus point. Next, images are sorted based on a cost metric. One such metric may combine, but is not limited to, the proximity of the image center to the visual locus and/or the proximity of the image color values around the locus point to the center of the range of the colorspace expressible by the image. Finally, the image with the highest score is selected. The intuition behind this is that basing photometric parameters on an image that is partially blown out (either too dark or too light), would result in garbage parameters, because the parameters can vary wildly without affecting output image, whereas photometric parameters that place the image contents as closely as possible to the center of the output image range would increase the level of detail available in the image and be a good basis for a "best exposure." Additionally pixels closer to the center of an image are less likely to have error induced by optical distortion and chromatic aberration, thus it makes sense to base photometric parameters on data most likely to be clean and error-free.

Step S220A reads the photometric parameters of the chosen image and uses/passes them on as the suggested virtual photometric parameters.

Step S210B computes a sample of intrinsic photographic inputs around the ray through the locus point. The sample may, in one preferable, but not limiting, implementation, be gathered from a gaussian distribution around the locus point. The width of the distribution may be, but is not limited to, a function of the field of view and/or shape and size of the display. In another preferable implementation, the sample may be constructed from the intrinsic photographic inputs in a circle of a variable radius around the locus point. Any suitable size, shape or selection criteria may be used. Choosing this step requires that a map of intrinsic photographic inputs has been pre-computed or can be computed on the fly (i.e., in realtime).

Step S220B involves solving an optimization that minimizes the error between a desired distribution of image values and the image values computed from sampled intrinsic photographic inputs and variable photometric parameters. In one preferable, but not limiting, implementation, the optimization may solve for maximizing the number of pixels with values not clamped at the bounds of the range of the image. In an example where the photometric parameters include exposure, this would mean finding the exposure that minimizes the area around the locus point that is blown out or underexposed. In another example, photometric parameters optimized may include the frequency response of a physically unbuildable camera that can adjust its frequency response to automatically show detail along the infrared spectrum in a dark area of VAR scene that would otherwise be underexposed. Any desirable optimization approach, such as, but not limited to least squares solvers or SVM's can be used to find photometric parameters.

Step S230 involves optionally adjusting the virtual photometric parameters based on the user's visual state. This step can to compensate for variations in the ways the user may perceive the display. In one preferable, but not limiting, implementation, the photometric parameters may be compensated to render the simulated image brighter in the presence of dilated pupils or sun incident on the display. This allows for greater immersion into the VAR scene as the environment between the user and the display can be compensated for in order to provide for a more consistent visual experience.

The next set of steps varies depending on if the VAR scene contains synthetic components, real components, or both. If synthetic components are needed then Step S510 and Step S610 are needed. If real components are needed then Step S710 and Step S720 are needed.

Step S510 provides a method to provide intrinsic photographic inputs from a synthetic environment. These input may be generated in any suitable way to the application. One preferable, but not limiting, implementation, may provide a color and polygon presence for each fragment which is then shaded in Step S610. Any suitable intermediate representation of intrinsic photographic inputs may be used, including but not limited to, bitmap buffers, fragment buffers, geometry lists, texture buffers and/or frame buffers. Additionally, the inputs may be defined dynamically by a vertex, fragment, or compute shader.

Step S610 provides a method to render a final synthetic image that may be optionally composited with the rest of a scene. This step may be implemented with OpenGL, OpenGL ES, Direct3D, SDL, or any other suitable graphics, rendering, or drawing engine. In one preferred, but not limiting, implementation, an OpenGL ES fragment shader may use an exposure as a photometric parameter to brighten or darken a fragment color passed in by a vertex shader. Any suitable rendering adjustment may be used to influence the rendered VAR scene.

Step S710 provides a method to compute for a given pixel the final output value for that pixel given the ray direction passing through it in the VAR scene, the intrinsic photographic inputs along that ray, and the virtual photometric parameters chosen in the preceding steps. This function, which is also used in Step S220B and Step S420, is a function of the camera model in use and may vary wildly. In one preferable, but not limiting, model the function may simply be an intrinsic photographic base color multiplied by an exponential function raising e to the power of the exposure time multiplied by a constant.

Step S720 composites all simulated pixel values into a final image to be displayed on a display of the device.

In the case of rendering a real VAR scene, a map of functions that take in virtual photometric parameters and output a simulated image must be derived. This map may store individual closures or just inputs to a fixed function that when combined with virtual photometric parameters will produce pixels in an image. Generating this map requires the acquisition of images and their exposure parameters and then deriving intrinsic photographic inputs from them.

Step 310A involves the camera itself automatically determining the set of parameters optimal for the content in the visible frustum of the camera. In some cases, where the Camera does not allow for the setting of explicit photometric parameters, the best one can do is to at least save the camera parameters chosen for the content in the current visible frustum.

Step 310B involves explicitly setting specific photometric parameters. In a preferred, but not limiting, implementation, this includes exposure in the set of photometric parameters used. For a given camera orientation, a set of images is taken with the exposure bracketed across a large range of exposures. This makes discerning the intrinsic radiosity of each ray in the VAR scene much easier because we can ensure that we have enough images to stretch the full dynamic range needed to express most images. In the case where we rely on Step 310A, one may have to settle with hoping that the camera's automatic exposure spans a large enough range to capture enough information to measure the true radiosity along any given ray in the VAR scene.

Step 320 includes saving the image, photometric parameters, and location in the VAR scene to be used in Step S210A and Step S410. The location in the VAR scene of an image may be represented by, but is not limited to, a focal length, translation, and/or an orientation. It may be computed from a gyroscope or other suitable orientation sensor and further updated by various computer vision tools used to align the images to their true position and/or orientation.

Step 410 includes collecting pairs of image values and photometric parameters used to capture the corresponding image values along each discretized ray direction in the VAR scene. This may be done, in one preferred, but not limiting implementation, by filling in a map from discretized ray values to a list of images and their image values along that ray as images are acquired and/or aligned and then iterating through each list for each discretized ray value. In one preferred, but not limiting implementation, ray values are discretized according to their latitude and longitude. In another, but not limiting implementation, ray values are discretized along their intersection to a cube. Any suitable mapping that all ray directions through the origin of a VAR scene may be used.

Step 420 defines a method to fit a parameterize photometric simulation function to pairs of intrinsic photographic inputs and real photometric parameters and the resultant image value. This method, in a preferred, but not limiting implementation, minimizes the error between the computed image value and the real image value. This can be done using a least-squares solver or any other suitable mathematical algorithm. The output of this method is an approximation of the intrinsic photographic properties needed to produce the captured images given the recorded photometric parameters. Additionally, this step can also help determine ideal photometric parameters that would help minimize future errors after executing this step. In one example, this solved may determine that it needs another lower-exposed image to fully compute the intrinsic photographic inputs in certain dark areas of an image.

A method for dynamically displaying virtual and augmented reality scenes can include determining input parameters; and calculating virtual photometric parameters; and rendering a VAR scene with a set of simulated virtual photometric parameters.

Other aspects may relate to determining the input parameters. In one variation of the method the input to the device comprises, but is not limited to, the orientation of the device from sensor inputs such as a gyroscope, magnetometer, accelerometer or other such suitable orientation measurement device. In one variation of the method the visual locus of the VAR scene is determined as the point which contains the vector through the center of the screen to the VAR scene as orientated by sensor inputs. In one variation of the method wherein the visual locus of the VAR scene is determined as the ray at which the user's eyes are directed on screen as determined by eye tracking or similar techniques. As further variations of the method the input to the device can include the point at which a cursor or touch point is positioned on the display; input from an EEG device or other similar brain interface system; the dilation of the user's pupils; the ambient light around the user; the location of the sun; the current time; and/or a user's location.

Other aspects may relate to determining the virtual photometric parameters. In one preferred implementation of the method one component of the virtual photometric parameters can include all or a combination of the variations wherein the exposure is measured as a function of aperture size, exposure duration, ISO and/or other related exposure parameters; focus measured as focal length, aperture size and/or other suitable focus parameters; motion blur measured as radial rotation and/or spatial translation of the camera as a function of time or exposure duration; any software determined parameters such as white balance, sharpness, contrast, color filters or other related post-capture fillers; radiance across wavelengths beyond the spectrum visible to humans; and/or response to various forms of polarized light.

Further aspects of the method may include calculating the virtual photometric parameters. In one variation of the method the set of virtual photometric parameters is determined from one image determined to be optimal based on the input parameters. In one preferred implementation of the method the source image of the virtual photometric parameters maybe chosen from a set of images that intersect with the ray through the visual locus; chosen based on a distance to a desirable set of photometric parameters; chosen based on an exposure setting that is exposed closes to the center of the bounds of the image representation; and/or chosen based on the distance from the center of each image to the visual locus. In another variation of the method the set of virtual photometric parameters is determined by sampling a set of intrinsic photographic inputs around the visual locus and computing a dynamic set of virtual photometric parameters. In one preferred implementation of the method the set of sampled intrinsic photographic inputs can be determined as a function of the screen dimensions and/or shape. The sampled intrinsic photographic inputs can additionally or alternatively be determined as a function of the field-of-view of the VAR scene. As an additional variation, the set of virtual photometric parameters are chosen to result in the greatest number of output image values that are within the bounds of the dynamic range of the image representation. The exposure may be among the set of virtual photometric parameters that are optimized. In one variation of the method the chosen photometric parameters are further adjusted by the user's visual state. As an addition to this and other variations, the chosen photometric parameters may additionally consist of exposure that is scaled with the diameter of the user's pupils; exposure that is scaled with the position of the sun; and/or exposure that is scaled with the ambient light around the user.

Other aspects may relate to simulating the virtual photometric parameters. In one variation of the method the chosen photometric parameters are combined with a function that takes intrinsic photometric inputs to produce a simulated virtual image. As an additional variation, the intrinsic photometric inputs comprises a set of radiance or luminance values along each ray of the VAR image. The simulated virtual image function may include a component that scales the resultant value an exponential function of the intrinsic radiance of the ray, the exposure duration and a constant multiplier. The simulated virtual image function may additionally or alternatively take as input photometric parameters that act as multipliers along each image channel to adjust the white balance of the resulting image. The simulated virtual image function may additionally or alternatively take as input intrinsic plenoptic measurements through the each given pixel to produce light-field-adjusted simulated virtual images. The simulated virtual image function may additionally or alternatively consider the depth of the object represented at each pixel as an intrinsic photographic input.

In one variation, the intrinsic photometric inputs are generated synthetically instead of, or in addition to, a photographic process. As another variation, intrinsic photometric inputs consist of a collection of intrinsic photometric inputs from different images that each contain information for the given ray. As another variation, the intrinsic photometric inputs consists of a set of photometric inputs merged from a collection of intrinsic photometric inputs from different images that each contain information for the given ray. The intrinsic photometric inputs may consist of the measured red, green, blue (or any other suitable channels in the capture color space) values that were measured at the time of image capture.

The method may include capturing resources required to simulate the virtual photometric parameters. The intrinsic photometric inputs may be generated by a camera that captures images and records the photometric parameters of the capture. The camera may actively capturing images while a photometrically diverse VAR scene is being displayed and a map of intrinsic photometric inputs is being updated in real-time.

In one variation, the camera is setting the photometric parameters to best fit an optimization function for the given instantaneous image content. In another variation, the camera is setting the photometric parameters to expand the diversity of photometric parameters in images captured around a specific area in the VAR scene. In yet another variation, the camera explicitly brackets exposure to collect images with exposures of varying levels for each area in the VAR scene.

The system and methods of the preferred embodiment and variations thereof can be embodied and/or implemented at least in part as a machine configured to receive a computer-readable medium storing computer-readable instructions. The instructions are preferably executed by computer-executable components preferably integrated with a photometrically diverse compute module and a VAR scene rendered connected to a display. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for dynamically displaying virtual and augmented reality (VAR) scenes comprising:
    capturing a plurality of real images comprising a plurality of real photometric parameters with a camera of a device;
    determining visual input parameters for the device based on the plurality of real images by calculating a graphical projection of a three-dimensional VAR scene of the plurality of real images without synthetic components to be shown on a digital display of the device, calculating a visual locus of the three-dimensional VAR scene for the digital display of the device, and computing a discretized ray direction of the three-dimensional VAR scene for each image of the plurality of real images through the visual locus;
    storing the plurality of real images, the plurality of real photometric parameters of the plurality of real images, and locations of the plurality of real images within the three-dimensional VAR scene on the device;
    based on the plurality of real photometric parameters of the plurality of real images, determining a plurality of virtual photometric parameters, wherein the plurality of virtual photometric parameters comprise at least one of: a first component for focus measured as focal length or aperture size; or a second component for a response to various forms of polarized light;
    generating a map of the three-dimensional VAR scene of the plurality of real images by capturing a pair of image values for each of the plurality of real images along a corresponding discretized ray direction in the three-dimensional VAR scene as each image is captured, identifying the virtual photometric parameters that intersect at each discretized ray direction for the plurality of real images, and, for each discretized ray direction, computing a plurality of intrinsic photographic inputs to define a parameterized photometric simulation function; and
    rendering the three-dimensional VAR scene of the plurality of real images with a plurality of simulated virtual photometric parameters by determining a value of each pixel for the three-dimensional VAR scene using the parameterized photometric simulation function and rendering a plurality of pixels into an output image that comprises some of the plurality of real images without synthetic components depicted within the VAR scene.

2. The method of claim 1, wherein one of the visual input parameters for the device comprises an orientation of the device from sensor inputs comprising at least one of a gyroscope, a magnetometer, or an accelerometer.

3. The method of claim 1, wherein the visual locus of the three-dimensional VAR scene of the plurality of real images is determined as a point that contains a vector through a center of a screen to the three-dimensional VAR scene as oriented by sensor inputs.

4. The method of claim 1, wherein the visual locus of the three-dimensional VAR scene of the plurality of real images is determined as a ray at which a user's eyes are directed on screen as determined by eye tracking.

5. The method of claim 1, wherein the visual locus of the three-dimensional VAR scene of the plurality of real images comprises a point at which a cursor or a touch point is positioned on the digital display of the device.

6. The method of claim 1, wherein capturing the plurality of real images comprises discretely capturing with the camera real images that together represent the VAR scene.

7. The method of claim 1, wherein the plurality of virtual photometric parameters further comprises a component adjusted based on a dilation of a user's pupils.

8. The method of claim 1, wherein the plurality of virtual photometric parameters further comprises a component adjusted based on ambient light captured around a user.

9. The method of claim 1, wherein computing the plurality of intrinsic photographic inputs to define the parameterized photometric simulation function comprises computing a set of radiance or luminance values along each ray of the VAR scene.

10. The method of claim 1, wherein the plurality of virtual photometric parameters further comprises motion blur measured as one or both of radial rotation and spatial translation of the camera as a function of time or exposure duration.

11. The method of claim 1, wherein the plurality of virtual photometric parameters further comprises any software determined parameters, including white balance, sharpness, contrast, or color filters.

12. The method of claim 1, wherein the plurality of virtual photometric parameters further comprises a radiance across wavelengths beyond a spectrum visible to humans.

13. The method of claim 1, wherein the plurality of virtual photometric parameters is determined from one source image determined to be optimal based on the visual input parameters.

14. The method of claim 13, wherein the source image is chosen from a set of images that intersect with a ray through the visual locus.

15. The method of claim 1, wherein the plurality of virtual photometric parameters is determined by sampling the plurality of intrinsic photographic inputs around the visual locus and computing a dynamic plurality of virtual photometric parameters.

16. The method of claim 1, wherein the plurality of virtual photometric parameters comprises a component adjusted based on a user's visual state.

17. A non-transitory computer readable storage medium comprising instructions that, when executed by at least one processor, cause a computing device to:
    capture a plurality of real images comprising a plurality of real photometric parameters with a camera of the computing device;
    determine visual input parameters for the computing device based on the plurality of real images by calculating a graphical projection of a three-dimensional virtual and augmented reality (VAR) scene of the plurality of real images without synthetic components to be shown on a digital display of the computing device, calculating a visual locus of the three-dimensional VAR scene for the digital display of the computing device, and computing a discretized ray direction of the three-dimensional VAR scene for each image of the plurality of real images through the visual locus;
    store the plurality of real images, the plurality of real photometric parameters of the plurality of real images, and locations of the plurality of real images within the three-dimensional VAR scene on the computing device;
    based on the plurality of real photometric parameters of the plurality of real images, determine a plurality of virtual photometric parameters, wherein the plurality of virtual photometric parameters comprise at least one of a first component for focus measured as focal length or aperture size or a second component for a response to various forms of polarized light;

generate a map of the three-dimensional VAR scene of the plurality of real images by capturing a pair of image values for each of the plurality of real images along a corresponding discretized ray direction in the three-dimensional VAR scene as each image is captured, identifying the virtual photometric parameters that intersect at each discretized ray direction for the plurality of real images, and, for each discretized ray direction, computing a plurality of intrinsic photographic inputs to define a parameterized photometric simulation function; and render the three-dimensional VAR scene of the plurality of real images with a plurality of simulated virtual photometric parameters by determining a value of each pixel for the three-dimensional VAR scene using the parameterized photometric simulation function and rendering a plurality of pixels into an output image that comprises some of the plurality of real images without synthetic components depicted within the VAR scene.

18. The non-transitory computer readable storage medium of claim 17, further comprising instructions that, when executed by the at least one processor, cause the computing device to compute the plurality of intrinsic photographic inputs to define the parameterized photometric simulation function by computing a set of radiance or luminance values along each ray of the VAR scene.

19. A non-transitory computer readable storage medium comprising instructions that, when executed by at least one processor, cause a system to:

receive a plurality of real images comprising a plurality of real photometric parameters with a camera of a client device;

determine visual input parameters for the client device based on the plurality of real images by calculating a graphical projection of a three-dimensional virtual and augmented reality (VAR) scene of the plurality of real images without synthetic components to be shown on a digital display of the client device, calculating a visual locus of the three-dimensional VAR scene for the digital display of the client device, and computing a discretized ray direction of the three-dimensional VAR scene for each image of the plurality of real images through the visual locus;

store the plurality of real images, the plurality of real photometric parameters of the plurality of real images, and locations of the plurality of real images within the three-dimensional VAR scene on the system;

based on the plurality of real photometric parameters of the plurality of real images, determine a plurality of virtual photometric parameters, wherein the plurality of virtual photometric parameters comprise at least one of: a first component for focus measured as focal length or aperture size; or a second component for a response to various forms of polarized light;

generate a map of the three-dimensional VAR scene of the plurality of real images by capturing a pair of image values for each of the plurality of real images along a corresponding discretized ray direction in the three-dimensional VAR scene as each image is captured, identifying the virtual photometric parameters that intersect at each discretized ray direction for the plurality of real images, and, for each discretized ray direction, computing a plurality of intrinsic photographic inputs to define a parameterized photometric simulation function; and generate, for display on the client device, the three-dimensional VAR scene of the plurality of real images with a plurality of simulated virtual photometric parameters by determining a value of each pixel for the three-dimensional VAR scene using the parameterized photometric simulation function and generating a plurality of pixels for an output image that comprises some of the plurality of real images without synthetic components depicted within the VAR scene.

20. The non-transitory computer readable storage medium of claim 19, further comprising instructions that, when executed by the at least one processor, cause the system to the determine the plurality of virtual photometric parameters by sampling the plurality of intrinsic photographic inputs around a visual locus and computing a dynamic plurality of virtual photometric parameters.

* * * * *